(12) United States Patent
Jang

(10) Patent No.: US 11,506,273 B2
(45) Date of Patent: Nov. 22, 2022

(54) DECELERATOR COOLING SYSTEM AND METHOD OF CONTROLLING THE SAME

(71) Applicants: HYUNDAI MOTOR COMPANY, Seoul (KR); KIA MOTORS CORPORATION, Seoul (KR)

(72) Inventor: Do Youn Jang, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 568 days.

(21) Appl. No.: 16/578,642

(22) Filed: Sep. 23, 2019

(65) Prior Publication Data

US 2020/0166116 A1    May 28, 2020

(30) Foreign Application Priority Data

Nov. 28, 2018   (KR) .................. 10-2018-0149142

(51) Int. Cl.
| | |
|---|---|
| *B60K 17/34* | (2006.01) |
| *F16H 57/04* | (2010.01) |
| *B60K 11/02* | (2006.01) |
| *B60H 1/14* | (2006.01) |
| *B60H 1/00* | (2006.01) |
| *F01P 7/16* | (2006.01) |
| *F28D 21/00* | (2006.01) |

(52) U.S. Cl.
CPC ..... *F16H 57/0412* (2013.01); *B60H 1/00885* (2013.01); *B60H 1/14* (2013.01); *B60H 1/143* (2013.01); *B60K 11/02* (2013.01); *F01P 7/164* (2013.01); *F16H 57/0413* (2013.01); *F16H 57/0476* (2013.01); *B60L 2240/36* (2013.01); *F28D 2021/0028* (2013.01)

(58) Field of Classification Search
CPC ............ F16H 57/0412; F16H 57/0413; F16H 57/0476; B60H 1/00885; B60H 1/14; B60H 1/143; B60K 11/02; F01P 7/164; B60C 2240/36; F28D 2021/0028
USPC ........................................................ 180/339
See application file for complete search history.

(56) References Cited

U.S. PATENT DOCUMENTS

| | | | |
|---|---|---|---|
| 2017/0082159 A1* | 3/2017 | Son ................... | F16D 65/0006 |
| 2020/0078963 A1* | 3/2020 | Narita ................ | F16N 13/20 |
| 2020/0109658 A1* | 4/2020 | Yang ................... | B60K 7/0007 |
| 2021/0086608 A1* | 3/2021 | Finger-Albert ...... | H02K 9/19 |

* cited by examiner

*Primary Examiner* — Davis D Hwu
(74) *Attorney, Agent, or Firm* — Lempia Summerfield Katz LLC

(57) ABSTRACT

The present disclosure provides a cooling system including a decelerator and a cooling line provided in a gear housing to cool at least one of a gear and a lubricant. The cooling system is configured to control the temperature of the lubricant inside the decelerator by circulating a coolant through the cooling line. The decelerator includes a gear set including the gear and the lubricant for accommodating a backlash and a gear housing configured to surround the gear set for transmitting a torque output from an electric motor through the decelerator to a drive shaft and vehicle wheels.

14 Claims, 7 Drawing Sheets

- PRIOR ART -

DECELERATOR COOLING SYSTEM AND METHOD OF CONTROLLING THE SAME

CROSS-REFERENCE TO RELATED APPLICATION

This application claims priority to and the benefit of Korean Patent Application No. 10-2018-0149142, filed on Nov. 28, 2018, which is incorporated herein by reference in its entirety.

FIELD

The present disclosure relates to a decelerator cooling system for a vehicle and a method of controlling the same.

BACKGROUND

The statements in this section merely provide background information related to the present disclosure and may not constitute prior art.

An electric vehicle represents a transportation device that travels by receiving a rotational force generated from an electric motor driven on electricity.

Unlike a vehicle using an internal combustion engine, the electric vehicle has a drive-train in the form of a combination of an electric motor and a decelerator rather than a combination of an engine and a transmission. In detail, the driving of the electric vehicle employs a method of transmitting a torque output from the electric motor through gears of a decelerator to a drive shaft and vehicle wheels.

A clearance is needed between the gears of the decelerator that transmits a torque, and is referred to as a backlash. When the direction of the torque is converted, noise and shock due to the backlash may occur.

The above information disclosed in this Background section is only for enhancement of understanding of the background of the present disclosure, and therefore it may contain information that does not form the prior art that is already known to a person of ordinary skill in the art.

SUMMARY

The present disclosure provides a decelerator cooling system for inhibiting lubricant inside a joint of a drive shaft coupled to a decelerator from being overheated, and a method of controlling the same.

According to an aspect of the present disclosure, a cooling system includes a decelerator, and a cooling line provided in a gear housing to cool at least one of a gear and a lubricant. In addition, the decelerator includes a gear set including the gear and the lubricant for accommodating a backlash, and the gear housing configured to surround the gear set.

According to a further aspect of the present disclosure, the cooling system may further include a temperature sensor, an electric water pump driven based on a temperature value of the decelerator that is obtained by the temperature sensor, and a controller including at least one processor and controlling a driving and a revolutions per minutes (RPM) of the electric water pump.

The temperature sensor may be provided inside the decelerator.

The cooling line may be attached to the gear housing in a ring shape.

The cooling line may pass through at least one control module to cool the at least one control module. In addition, the control module includes at least one of a motor control unit (MCU), a transmission control unit (TCU), an on-board charger (OBC), and an electric power control unit (EPCU).

According to a further aspect of the present disclosure, the cooling line may include a first cooling line and a second cooling line, and the first cooling line and the second cooling line may receive a coolant from a same branch. The first cooling line may pass through at least one control module to cool the at least one control module, and the control module may include at least one of a motor control unit (MCU), a transmission control unit (TCU), an on-board charger (OBC), and an electric power control unit (EPCU), and the second cooling line may pass through the decelerator to cool the decelerator.

According to a further aspect of the present disclosure, the controller may control the electric water pump to be turned on when the temperature sensor senses a temperature value equal to or higher than a predetermined temperature value.

According to a further aspect of the present disclosure, the controller may be configured to control the electric water pump to be turned on when the temperature sensor senses a temperature value equal to or higher than a predetermined first temperature value, and control the electric water pump to be turned off when the temperature sensor senses a temperature value equal to or lower than a predetermined second temperature value.

According to another aspect of the present disclosure, a method for controlling a vehicle including a decelerator, a cooling line, and an electric water pump includes steps of receiving a temperature value obtained by a temperature sensor provided in the decelerator, determining a driving and a revolutions per minutes (RPM) of the electric water pump on the basis of the temperature value, and supplying a coolant to a cooling line installed on the decelerator and cooling the decelerator on the basis of the RPM of the electric water pump.

The determining of a driving and an RPM of the electric water pump on the basis of the temperature value may include controlling the electric water pump to be turned on when the temperature sensor senses a temperature value equal to or higher than a predetermined temperature value.

The determining of a driving and an RPM of the electric water pump on the basis of the temperature value may include controlling the electric water pump to be turned on when the temperature sensor senses a temperature value equal to or higher than a predetermined first temperature value, and controlling the electric water pump to be turned off when the temperature sensor senses a temperature value equal to or lower than a predetermined second temperature value.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
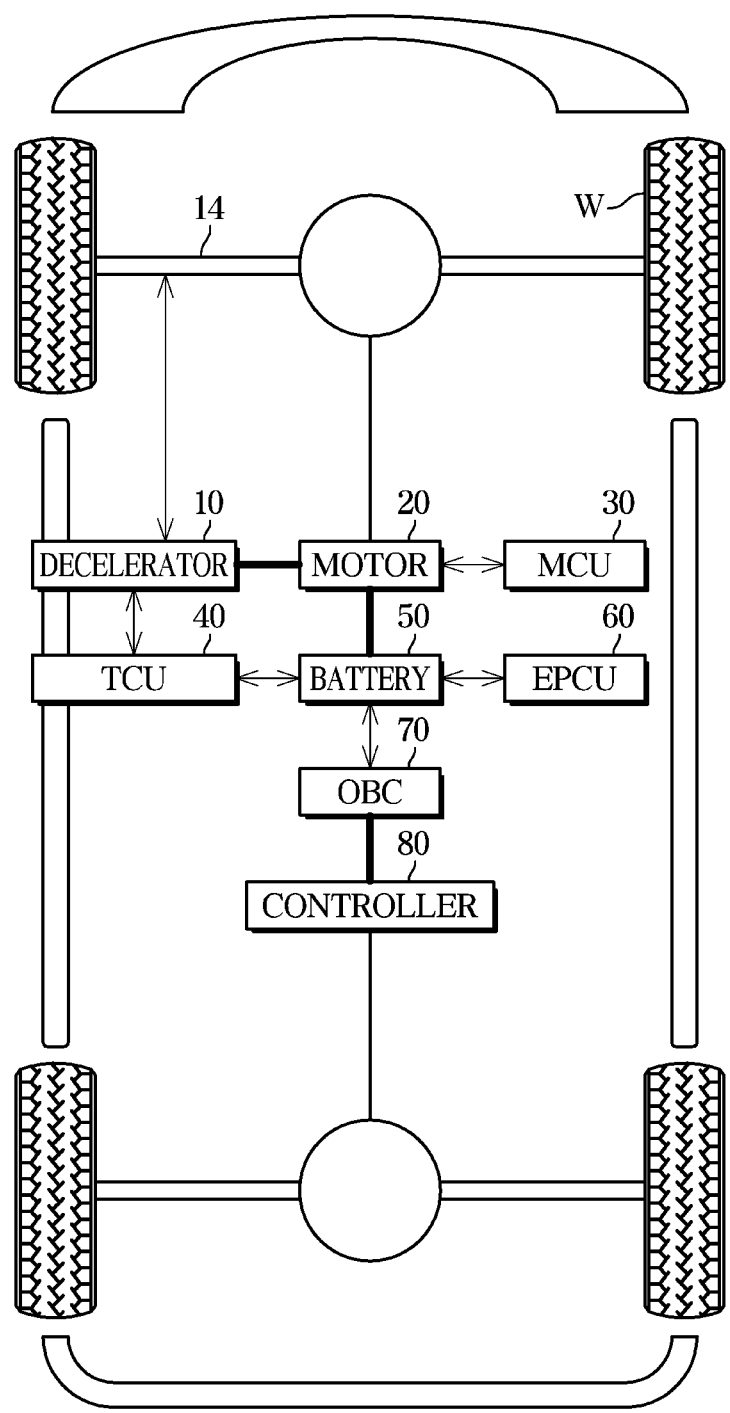
FIG. 1 is a view illustrating a power system and a control system of a vehicle according to a form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Not all elements of forms of the present disclosure will be described, and description of what are commonly known in the art or what overlap each other in the forms will be omitted. The terms as used throughout the specification, such as "~part", "-module", "~member", "~block", etc., may be implemented in software and/or hardware, and a plurality of "~parts", "~modules", "~members", or "~blocks" may be implemented in a single element, or a single "~part", "~module", "~member", or "~block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof, unless the context clearly indicates otherwise.

Further, when it is stated that a layer is "on" another layer or substrate, the layer may be directly on another layer or substrate or a third layer may be disposed therebetween.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

According to a form of the present disclosure, a vehicle employing a cooling system will be briefly described. Generally, unlike the conventional engine-driven vehicles, electric vehicles (EVs), hybrid electric vehicles (HEV), and fuel cell vehicles, which are eco-friendly vehicles, may be driven by the power of a motor operating on a battery. The electric vehicle and the hybrid vehicle, different from an internal combustion engine vehicle driven by a combination of an engine and a transmission, are driven by a combination of a motor and a decelerator 10. The decelerator 10 transmits a torque output from a motor through gears of the decelerator 10 to a drive shaft 14 so that a rotational force is transmitted to vehicle wheels W.

FIG. 1 is a schematic view illustrating a power system and a control system of a vehicle according to a form of the present disclosure. Referring to FIG. 1, a vehicle according to a form of the present disclosure includes a decelerator 10, a motor 20, a motor control unit (MCU) 30, a transmission control unit (TCU) 40, a battery 50, an electric power control unit (EPCU) 60, an on-board charger (OBC) 70, and a controller 80.

The decelerator 10 receives the power of the motor 20 and increases or decreases the received power to adjust a torque transmitted to the vehicle wheels. Further, the decelerator 10 reduces the number of rotations (revolutions per minutes, RPM) of the motor 20, and transmits driving power at reduced RPM to the drive shaft of the vehicle wheels.

Figure 2:
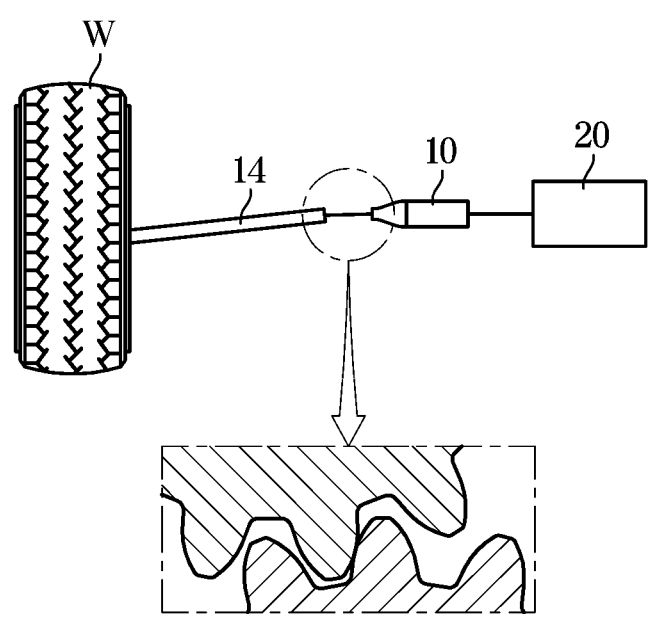
FIG. 2 is a view for describing a backlash suggested in various forms of the present disclosure.

The decelerator 10 and various configurations connected to the decelerator 10 will be described with reference to FIG. 2. In order to transmit a torque to the vehicle wheels W, the decelerator 10 may increase or decrease the power generated by the motor 20 and transmit the increased or decreased power to the drive shaft 14, and the drive shaft 14 transmit the received power to the vehicle wheels W. In this case, a clearance is inevitably generated between gears that couple the decelerator 10 to the drive shaft 14, which is referred to as a backlash. Referring to the lower part of FIG. 2, a space is formed between teeth surfaces of two gears. Conversion of the direction of a torque causes backlash noise or shock, which deteriorates the drivability and causes gear wear.

To improve these shortcomings, a method of reducing the backlash by deforming the physical structure in the initial design stage may be used. However, since there is a need for a certain amount of backlash for the mechanical driving, the above-described method has limitations in manufacturing and design.

Meanwhile, the decelerator 10 is coupled to the drive shaft 14 that connects a differential gear of the decelerator 10 to the vehicle wheels W. In a portion at which the differential gear is coupled to the drive shaft 14, a joint for accommodating a lubricant is provided, and the lubricant serves to relieve friction between bearings in the joint. However, when the vehicle travels for a long period of time, the overall temperature inside the drive-train rises and the heat is transferred even to the space for accommodating the lubricant, increasing the temperature of the lubricant, so that the viscosity of the lubricant is lowered than the inherent viscosity. Accordingly, the portion at which the differential gear is coupled to the drive shaft 14, that is, inside the joint of the drive shaft 14, comes to have noise and shock.

In order to remove the above-mentioned limitations, a cooling line on the decelerator 10 according to a form of the present disclosure is installed to inhibit the temperature of the lubricant from rising so that the friction or noise of the gear coupling portion is reduced. Details of the configuration and operation thereof will be described below.

Referring back to FIG. 1, the motor 20 may operate on an alternating voltage applied through an inverter (not shown) in the battery 50 to generate a torque, and may serve as a generator during coasting to supply regenerative energy to the battery 50. Further, the motor 20 may transmit the power to the decelerator 10 and indirectly supply a turning force for turning the vehicle wheels.

The MCU 30 is a motor control unit, which controls the overall operation of the motor 20.

The TCU 40 is a transmission control unit, which controls the overall operation of the decelerator 10.

The battery 50 includes a plurality of unit cells, and may supply energy for driving the motor 20.

The EPCU 60 is an electric power control unit, which is connected to the OBC (on-board charger) 70 for charging the battery 50 to control the electric power. The EPCU 60 may include an inverter, a converter, a high voltage distributor, and the like.

The OBC 70 is an on-board charger which may charge the battery 50.

The controller 80 may control the driving of an electric water pump (EWP) which will be described below. In detail, the controller 80 determines whether the temperature of the gears or the like provided in the decelerator 10 is equal to or higher than a predetermined value, and controls the driving of the EWP according to an output of the determination.

The controller 80 includes one or more memories (not shown) for memorizing/storing programs and data, and one or more processors (not shown) for processing the data memorized/stored in the memories according to the programs memorized/stored in the memories. The controller 80 may include hardware, such as the processor and the memory, and software, such as the programs and the data memorized/stored in the memories.

Figure 3:
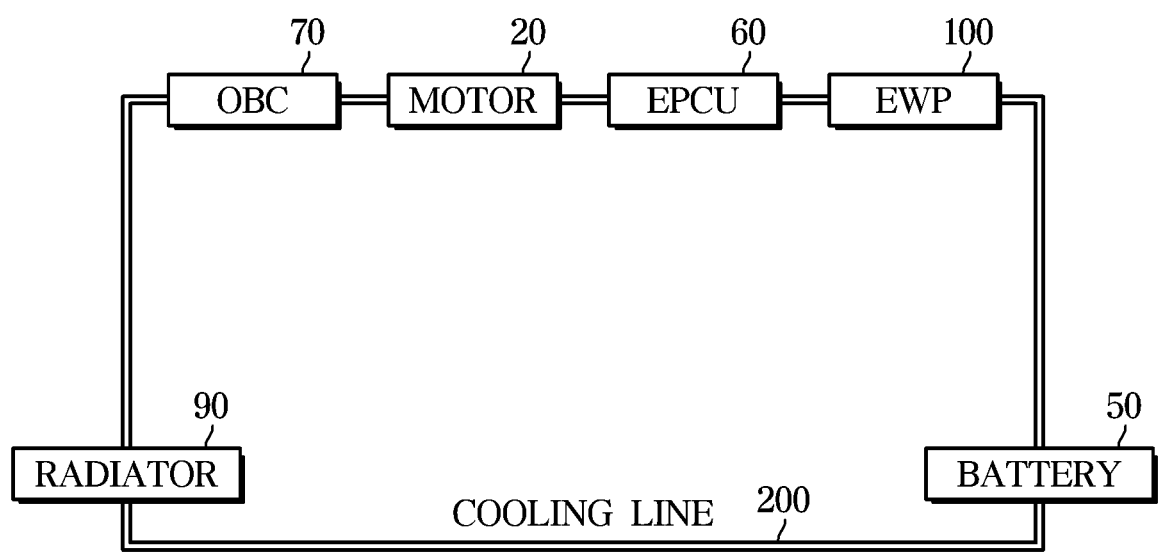
FIG. 3 is a block diagram describing the existing cooling system.

FIG. 3 is a schematic view for describing the existing cooling system.

Referring to FIG. 3, the cooling system includes a radiator 90, an OBC 70, a motor 20, an EPCU 60, a EWP 100, a battery 50 and a cooling line 200.

The radiator 90 is a tube in which a coolant circulating around the motor 20 is cooled by the flow of air. The radiator 90 may draw air into a heat radiating plate provided therein so that the coolant increased in the temperature is cooled. The radiator 90 may inhibit the above described components from being overheated by allowing the coolant lowered in the temperature to pass through the cooling line 200.

The EWP 100 is an electric water pump, which forcibly circulates the coolant in the cooling line 200. The EWP 100 may be controlled to be driven under the control of the controller 80. A process of controlling the EWP 100 by the controller 80 will be described in detail with reference to FIGS. 4 and 5.

The conventional cooling systems have been designed such that the cooling line 200 passes through the motor 20 to inhibit the motor 20 from being overheated. In addition, the various processors, for example, a control board, such as the EPCU 60, the OBC 70, and the like are also protected from ambient heat as the cooling line 200 passes through the various processors.

In the conventional cooling system, as shown in FIG. 3, the decelerator 10 (see FIG. 2) is simply designed only for the gears, determining that other components are not particularly overheated and are not likely to exert influence on the control, so that the other components including the decelerator 10 are excluded in the cooling line. However, when the vehicle travels a long time, the gears provided in the decelerator 10 and the lubricant contained in the joint of the drive shaft 14 are heated. Hereinafter, a new cooling system for controlling the temperature of the entire decelerator 10 will be described in detail with reference to FIGS. 4 and 5.

Figure 4:
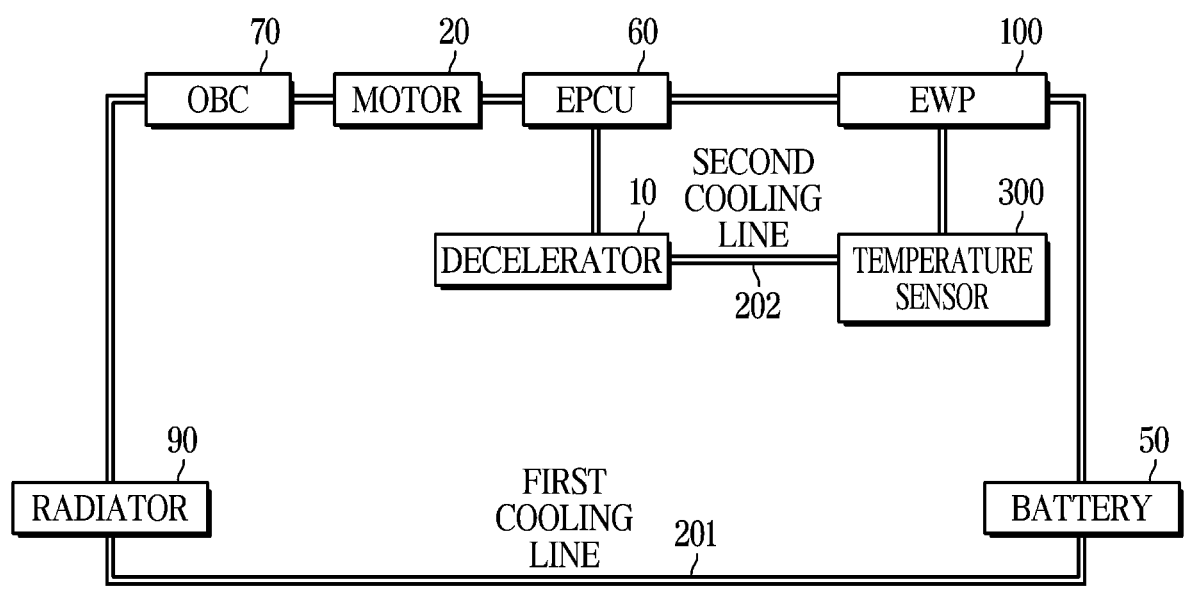
FIG. 4 is a block diagram illustrating a cooling system according to a form of the present disclosure.

FIG. 4 is a block diagram illustrating a cooling system according to a form of the present disclosure. The cooling system according to the form of the present disclosure includes a radiator 90, an OBC 70, a motor 20, an EPCU 60, a EWP 100, a battery 50, a cooling line 200, a decelerator 10, and a temperature sensor 300.

The present disclosure is provided to cool a differential gear and a lubricant of the decelerator in order to prevent or inhibit the viscosity of the lubricant from being lowered due to accommodation of heat in a backlash space of the gear when the drive-train of the vehicle is driven for a long time. In detail, the differential gear of the decelerator into which the joint connected to the drive shaft is inserted and an area adjacent to the differential gear may be cooled.

As shown in FIG. 4, the cooling line 200 may be provided on a side of a joint boot surrounding the joint of the drive shaft 14, but since the drive shaft 14, which is a rotating component, may have difficulty in employing the existing cooling line 200 as it is. According to the form of the present disclosure, the cooling line 200 is installed on a side of the decelerator 10 to indirectly cool the lubricant.

As described above, the cooling line 200 may be designed to collectively cool the motor 20 and various control modules (the MCU 30, the TCU 40, the EPCU 60, and the OBC 70). In FIG. 4, the cooling line 200 may be designed to be installed to pass through the decelerator 10 so that the decelerator 10 is cooled together with the motor 20 and various control modules.

According to a form of the present disclosure, the cooling line 200 is divided into a first cooling line 201 and a second cooling line 202 from the same branch point to receive a coolant from the same EWP 100. As shown in FIG. 4, the decelerator 10 is disposed on the second cooling line 202, which is separately provided, to receive the coolant so that the decelerator 10 is prevented or inhibited from being overheated.

Figure 5:
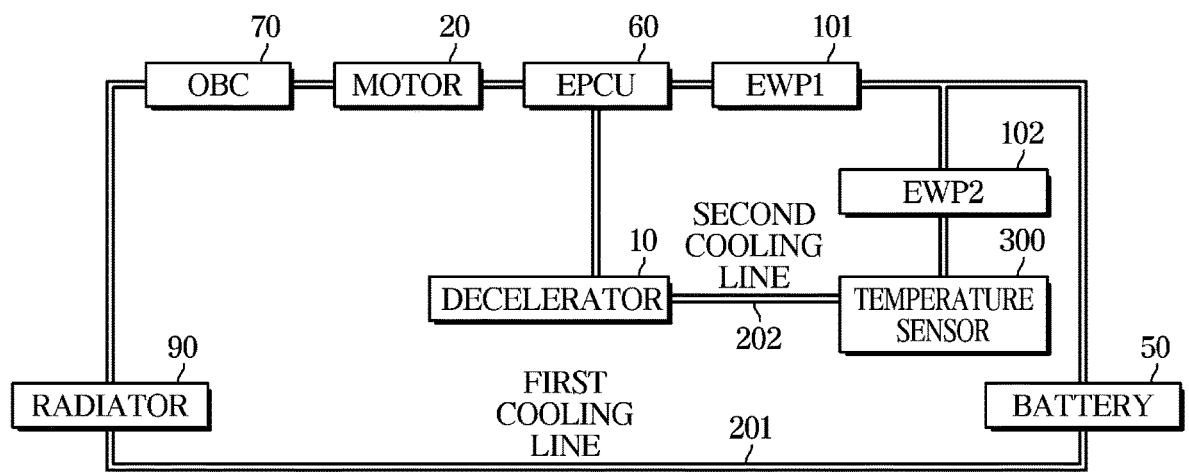
FIG. 5 is a block diagram illustrating a cooling system according to another form of the present disclosure.

FIG. 5 is a block diagram illustrating a cooling system according to another form of the present disclosure. According to the form of the present disclosure, the cooling line 200 and the EWP are dualized such that cooling is independently controlled when the decelerator 10 has a predetermined temperature or higher.

The cooling system according to the form of the present disclosure includes a radiator 90, at least one control module, a decelerator 10, a first EWP (EWP1) 101 for controlling the supply of a coolant to a first cooling line 201, a second EWP (EWP2) 102 for controlling the supply of a coolant to a second cooling line 202, and a temperature sensor 300.

The first EWP (EWP1) 101 is provided to supply a coolant in the first cooling line 201 to prevent or inhibit the at least one control module from being overheated.

The second EWP (EWP2) 102 operates only when the decelerator 10 disposed on the second cooling line 202 has a predetermined temperature or higher and is used to control independent supply of a coolant in the second cooling line 202. The temperature sensor 300 is provided inside or outside the decelerator 10 to control the driving of the second EWP (EWP2) 102, and the driving of the second EWP (EWP2) 102 is controlled on the basis of the temperature value measured by the temperature sensor 300.

The second EWP (EWP2) 102 may determine the driving and rpm on the basis of the temperature value measured by the temperature sensor 300 provided inside the decelerator 10 so that a coolant flows through the second cooling line 202 at a predetermined temperature or higher. The temperature sensor 300 is not limited in the position thereof with respect to the decelerator 10, and may be provided at various positions in a spatially allowable range.

In addition, the second EWP (EWP2) 102 may determine the driving and RPM on the basis of the temperature value measured by the temperature sensor 300 provided outside the decelerator 10 so that a coolant flows through the second cooling line 202 at a predetermined temperature or higher. In this case, since the temperature sensor 300 is provided outside the decelerator 10, the temperature value measured by the temperature sensor 300 is lower than the actual temperature value of the lubricant accommodated in the gears of the decelerator 10. Accordingly, the actual temperature value of the lubricant may be estimated by adding a correction constant to the value measured by the temperature sensor 300.

The components and operations of the cooling system for inhibiting overheating of the decelerator 10 have been described above with reference to FIGS. 4 and 5. Hereinafter, the structure and arrangement of additional components of the decelerator for implementing the system will be described in detail.

Figure 6:
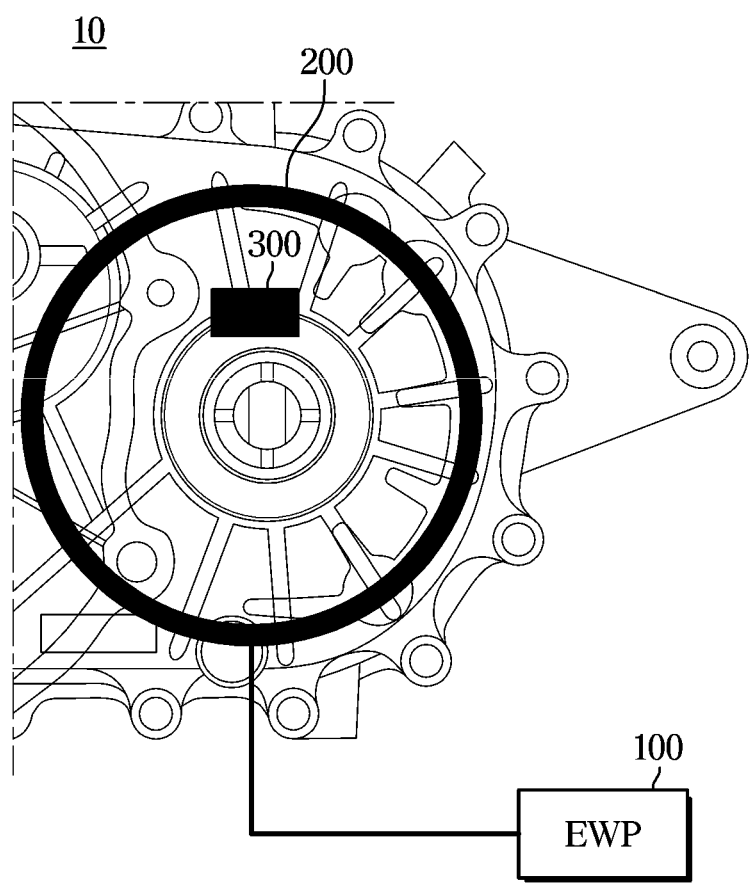
FIG. 6 is a view illustrating a decelerator suggested in a form of the present disclosure.

FIG. 6 is a detailed view illustrating a decelerator suggested according to a form of the present disclosure.

In general, the decelerator 10 is connected to one side of the motor 20 and is connected to one side of the drive shaft. The decelerator 10 is composed of a plurality of gears, and includes a gear set in which at least two gears are meshed with each other. Here, the gear set may include not only the gears but also a backlash for accommodating a lubricant. The gear set is also provided on at least one side thereof with a gear housing to divide the space in the decelerator 10 and inhibit the lubricant from being dispersed.

The lubricant prevents or inhibits teeth surfaces between gears from coming into a direct friction, and inhibits the gears from being worn. For example, the lubricant may be implemented using grease, but not limited thereto. For example, the lubricant may be implemented using various synthetic materials. In addition, the lubricant has a property of varying in viscosity depending on the temperature. When the temperature of the lubricant rises due to the motor 20 or the decelerator 10 being driven for a long time, the viscosity of the lubricant may be lowered, friction between gears may occur more frequently than at normal times, and shocks and noise may be generated between the gears. To remove such a limitation, the present disclosure provides the decelerator 10 having a cooling device for keeping the viscosity of the lubricant constant.

The decelerator 10 according to the form of the present disclosure may be provided therein with the temperature sensor 300, and may be connected to the EWP 100 that is driven on the basis of the temperature value of the decelerator 10 measured by the temperature sensor 300. The EWP 100 may have the driving and the RPM thereof determined under the control of the controller 80 provided in the vehicle. The EWP100 is connected to the cooling line 200 attached to the decelerator 10 to supply a coolant on the basis of the determined RPM. Accordingly, the decelerator 10 may be inhibited from being overheated, and the viscosity of the lubricant may be inhibited from being lowered.

According to a form of the present disclosure, the cooling line 200 may be attached to one side of the gear housing provided in the decelerator 10 in the form of a ring shape. As shown in FIG. 6, for example, the cooling line 200 may be attached to the gear housing while surrounding a side of the differential gear in which the decelerator 10 is coupled to the drive shaft. Accordingly, all the spaces in which the lubricant is accommodated are uniformly cooled, so that precise cooling control may be performed.

Further, according to the form or the present disclosure, the temperature sensor 300 may be provided inside or outside of the decelerator 10. The temperature sensor 300 may be provided not only on the decelerator 10 but also on the cooling line 200 to indirectly measure the temperature of the decelerator 10. The controller controls the EWP 100 to be driven when the temperature sensor 300 detects a temperature value equal to or higher than a predetermined temperature value.

Figure 7:
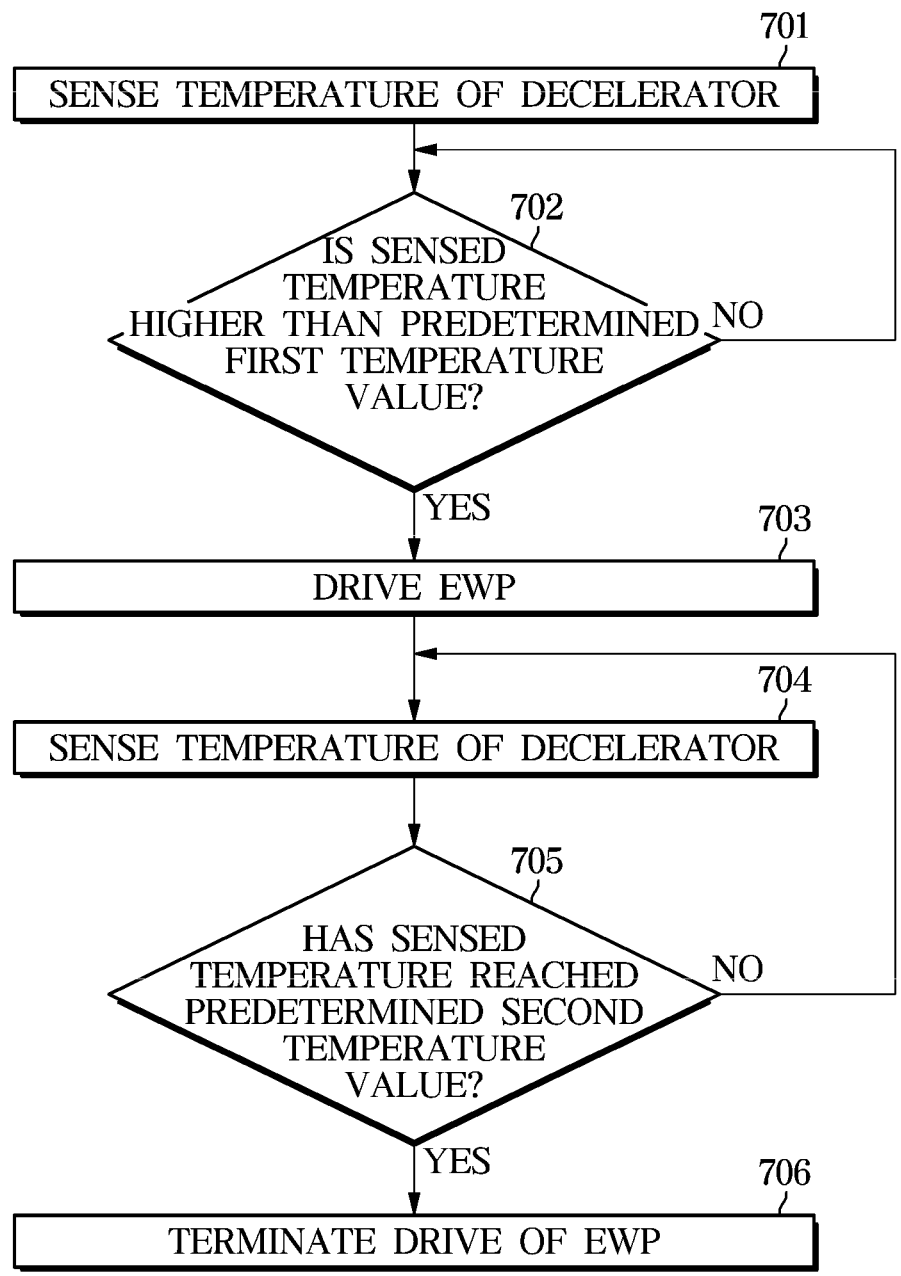
FIG. 7 is a flowchart showing a control method according to a form of the present disclosure.

FIG. 7 is a flowchart showing a control method according to a form of the present disclosure. However, this is merely exemplary, and it should be understood that some of the operations may be added or omitted, and the agent for performing each operation may be omitted.

The temperature of the decelerator 10 is sensed or measured (701). The temperature of the decelerator 10 may be measured in real time at regular intervals. The temperature of the decelerator 10 may be measured by a temperature sensor 300 provided inside or outside the decelerator 10.

It is determined whether the temperature sensed or measured in operation 701 is higher than a predetermined first temperature value (702). The first temperature value indicates a critical temperature at which the viscosity of the lubricant accommodated in the backlash space is changed. The first temperature value may be set differently depending on the type of the accommodated lubricant, and may be set differently according to various factors at a time of designing the cooling system. In addition, the first temperature value may be set differently depending on the position where the temperature sensor 300 is attached. For example, when the temperature sensor 300 is installed far from the differential gear, the temperature sensor may measure a temperature value lower than an actual temperature value of the lubricant. Accordingly, in this case, the first temperature value may be set to be lower than the existing value.

It is determined in operation 702 that when the temperature value measured by the temperature sensor 300 is lower than the first temperature value, cooling of the decelerator 10 is not needed, and the temperature of the decelerator 10 is sensed again in real time.

It is determined in operation 702 that when the temperature value measured by the temperature sensor 300 is equal to or higher than the first temperature value, the EWP is controlled to be driven to cool the decelerator 10 (703).

The temperature of the decelerator 10 is continuously sensed in real time (704), and it is determined whether the sensed temperature has reached a predetermined second temperature value (705). Here, the second temperature value indicates a temperature value at which the decelerator is cooled and the lubricant contained in the decelerator has an optimum viscosity. The second temperature value may be set differently depending on the type of the accommodated lubricant and may be set differently according to various factors at a time of designing the cooling system. When the cooling continues without operation 705, the viscosity of the lubricant is increased, so that the fuel efficiency may be lowered. Accordingly, there is a need to forcibly terminate the cooling process when the viscosity of the lubricant has an optimum value.

When the temperature of the decelerator 10 has dropped to reach the second temperature value, the drive of the EWP 100 is terminated (706).

The present disclosure may be embodied in the form of a recording medium storing instructions executable by a computer. The instructions may be stored in the form of program code and, when executed by a processor, may generate a program module to perform the operations of the disclosed forms. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, the gears in the decelerator 10 and the lubricant in the drive shaft joint can be prevented or inhibited from being overheated using the cooling line 200 of the decelerator 10 so that the viscosity of the lubricant is kept constant, thereby reducing the noise and shock and improving the performance and the lifespan of the gear parts and the like.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. A cooling system comprising:
   a decelerator;
   a temperature sensor;
   an electric water pump driven based on a temperature value of the decelerator that is obtained by the temperature sensor;
   a controller including at least one processor and controlling a driving and a revolutions per minutes (RPM) of the electric water pump; and
   a cooling line provided in a gear housing to cool at least one of a gear and a lubricant,
   wherein the decelerator comprises:
   a gear set including the gear and the lubricant for accommodating a backlash; and
   the gear housing configured to surround the gear set.

2. The cooling system of claim 1, wherein the temperature sensor is provided inside the decelerator.

3. The cooling system of claim 1, wherein the cooling line is attached to the gear housing in a ring shape.

4. The cooling system of claim 1, wherein the cooling line passes through at least one control module to cool the at least one control module, wherein the control module includes at least one of a motor control unit (MCU), a transmission control unit (TCU), an on-board charger (OBC), and an electric power control unit (EPCU).

5. The cooling system of claim 1, wherein the cooling line includes a first cooling line and a second cooling line, and the first cooling line and the second cooling line receives a coolant from a same branch,
   wherein the first cooling line passes through at least one control module to cool the at least one control module, and the control module includes at least one of a motor control unit (MCU), a transmission control unit (TCU), an on-board charger (OBC), and an electric power control unit (EPCU), and
   the second cooling line passes through the decelerator to cool the decelerator.

6. The cooling system of claim 1, wherein the controller controls the electric water pump to be turned on when the temperature sensor senses the temperature value equal to or higher than a predetermined temperature value.

7. The cooling system of claim 1, wherein the controller is configured to:
   control the electric water pump to be turned on when the temperature sensor senses the temperature value equal to or higher than a predetermined first temperature value, and
   control the electric water pump to be turned off when the temperature sensor senses the temperature value equal to or lower than a predetermined second temperature value.

8. A method of controlling a vehicle including a decelerator, a cooling line, and an electric water pump, the method comprising steps of:
   receiving a temperature value obtained by a temperature sensor provided in the decelerator;
   determining a driving and a revolutions per minutes (RPM) of the electric water pump on the basis of the temperature value; and
   supplying a coolant to the cooling line installed on the decelerator and cooling the decelerator on the basis of the RPM of the electric water pump.

9. The method of claim 7, wherein the temperature sensor is provided inside the decelerator.

10. The method of claim 7, wherein the cooling line is attached to the decelerator in a ring shape.

11. The method of claim 7, wherein the cooling line passes through at least one control module to cool the at least one control module, and the control module includes at least one of a motor control unit (MCU), a transmission control unit (TCU), an on-board charger (OBC), and an electric power control unit (EPCU).

12. The method of claim 7, wherein the cooling line includes a first cooling line and a second cooling line, and the first cooling line and the second cooling line receives the coolant from a same branch,
   wherein the first cooling line passes through at least one control module to cool the at least one control module, wherein the control module includes at least one of a motor control unit (MCU), a transmission control unit (TCU), an on-board charger (OBC), and an electric power control unit (EPCU), and
   the second cooling line passes through the decelerator to cool the decelerator.

13. The method of claim 7, wherein the determining of the driving and the RPM of the electric water pump on the basis of the temperature value includes controlling the electric water pump to be turned on when the temperature sensor senses the temperature value equal to or higher than a predetermined temperature value.

14. The method of claim 7, wherein the determining of the driving and the RPM of the electric water pump on the basis of the temperature value includes:
   controlling the electric water pump to be turned on when the temperature sensor senses the temperature value equal to or higher than a predetermined first temperature value; and
   controlling the electric water pump to be turned off when the temperature sensor senses the temperature value equal to or lower than a predetermined second temperature value.

* * * * *

UNITED STATES PATENT AND TRADEMARK OFFICE
CERTIFICATE OF CORRECTION

PATENT NO. : 11,506,273 B2
APPLICATION NO. : 16/578642
DATED : November 22, 2022
INVENTOR(S) : Do Youn Jang Page 1 of 1

It is certified that error appears in the above-identified patent and that said Letters Patent is hereby corrected as shown below:

In the Claims

Column 10, Claims 9-14, should all be dependent on Claim 8 (not Claim 7).

Signed and Sealed this
Seventh Day of February, 2023

Katherine Kelly Vidal
*Director of the United States Patent and Trademark Office*